(12) United States Patent
Xu et al.

(10) Patent No.: US 12,502,023 B2
(45) Date of Patent: Dec. 23, 2025

(54) UNCOATED PRESSED NON-STICK COOKWARE

(71) Applicant: ZHEJIANG JIUKANG ELECTRIC APPLIANCES CO., LTD., Jiaxing (CN)

(72) Inventors: Jiedong Xu, Jiaxing (CN); Huaqing Wang, Jiaxing (CN)

(73) Assignee: ZHEJIANG JIUKANG ELECTRIC APPLIANCES CO., LTD., Jiaxing (CN)

( * ) Notice: Subject to any disclaimer, the term of this patent is extended or adjusted under 35 U.S.C. 154(b) by 119 days.

(21) Appl. No.: 18/355,405

(22) Filed: Jul. 19, 2023

(65) Prior Publication Data

US 2025/0024989 A1  Jan. 23, 2025

(51) Int. Cl.
*A47J 36/02*  (2006.01)

(52) U.S. Cl.
CPC .................................. *A47J 36/025* (2013.01)

(58) Field of Classification Search
CPC ........ A47J 36/025; A47J 37/10; A47J 45/061; A47J 27/002
USPC ................................... 220/573.1, 573.2, 912
See application file for complete search history.

(56) References Cited

U.S. PATENT DOCUMENTS

| 1,216,973 A | * | 2/1917 | Epprecht | A47J 37/10 |
| | | | | 99/425 |
| 2005/0205582 A1 | * | 9/2005 | Cheng | A47J 36/02 |
| | | | | 220/573.3 |

* cited by examiner

*Primary Examiner* — Don M Anderson
*Assistant Examiner* — Elizabeth J Volz
(74) *Attorney, Agent, or Firm* — Treasure IP Group, LLC

(57) ABSTRACT

The uncoated pressed non-stick cookware, comprising an uncoated stainless-steel or uncoated titanium cookware body having a food contact surface, on which pits are uniformly distributed, wherein the pits have an aperture of 0.1-0.5 mm, wherein the area of the pits accounts for 15%-40% of the area of the entire cookware body.

5 Claims, 2 Drawing Sheets

UNCOATED PRESSED NON-STICK COOKWARE

TECHNICAL FIELD

The present invention relates to the preparation of non-stick cookware, and in particular to an uncoated pressed non-stick cookware and preparation thereof.

BACKGROUND ART

Current non-stick cookware generally refers to PTFE or Teflon-coated non-stick cookware. Due to resistance to the temperature up to 250° C., a PTFE or Teflon coating will become carbonized and fall off and even fall into the food being cooked once the temperature is greater than 250° C. As a result, such coating has problems such as short service life, intolerance to dry burning, and liability to shedding, which will also affect the health of users. The service life of existing non-stick cookware is short. There is also a non-stick cookware product having a surface of a honeycomb network structure. This non-stick cookware has large honeycomb holes with an aperture of more than 3 mm; the bottom surface of each honeycomb hole is also provided with a coating; and the coating generally has a large area that accounts for about 80%-90% of the surface area of a substrate. Therefore, a contact area between the coating and food is also large, resulting in a large friction surface with food, which will also limit the use of the spatula.

Nanoscale pores absorb air and oil during actual use, and produce hot air and oil mist during heating, while holding up food. In light of the fluff effect achieved by the aforementioned raised structure, the force of friction between food and the inner surface of cookware is reduced, and the non-stick effect is achieved by physical means without the addition of a chemical coating, such that consumers can cook food in a healthier fashion. If the cookware body is made of a titanium plate, a hardened layer of titanium dioxide with a Vickers hardness of not lower than HV600 will be formed on the surface of the titanium plate after micro-arc oxidation. If the cookware body is made of an aluminum alloy plate, a hardened layer of aluminum oxide with a Vickers hardness of not lower than HV1000 will be formed on the surface of the aluminum alloy plate after micro-arc oxidation. The plate is an aluminum plate, a titanium plate or a magnesium plate; and the surface of the plate with shallow pits etched or stamped is made of aluminum or magnesium or titanium. However, these materials do not show advantages in application.

In the prior art, there is also a non-stick cookware, in which an anti-stick structure is prepared on the inner wall of a cookware body. The anti-stick structure includes protrusions or/and pits that are distributed periodically on the inner wall. The protrusions and/or pits are sized in a range between a few microns and tens of microns, which, however, are too small. In the prior art above, the non-toxic and non-stick features cannot be well achieved. The single provision of a physical non-stick layer on the surface of the cookware body is not sufficient to achieve persistent non-stickiness, since repeated friction necessarily occurs between the spatula and the surface of the cookware during each operation. Consequently, the physical non-stick layer would be worn due to long-term friction, and then, the persistent non-stick effect cannot be achieved. This problem also needs to be solved.

SUMMARY OF THE INVENTION

To solve the above-mentioned problem, an object of the present invention is to provide an uncoated pressed non-stick cookware and a preparation method thereof, in particular a pressed non-stick cookware prepared at low cost.

CN 115778164 invention discloses an uncoated non-stick pan and a manufacturing method thereof, and relates to the technical field of cooks. The uncoated non-stick pan comprises a pan body, a plurality of anti-stick holes are distributed in the inner surface of the pan body, the inner walls and/or the bottom walls of the anti-stick holes are provided with hard oxide layers, the hard oxide layers are provided with nanoscale micropores, and the edges of part of or all the micropores are in a milky convex shape. A physical means is adopted, no chemical coating exists, and the coating-free physical non-sticky performance is still achieved. To achieve the above object, the following technical solutions are employed in the present invention: an uncoated pressed non-stick cookware includes an uncoated stainless-steel or uncoated titanium cookware body having a food contact surface, on which pits are uniformly distributed; the pits have an aperture of 0.1-0.5 mm, in particular 0.3-0.5 mm, and a distance between pit edges is 0.3-2 mm, and a depth of 0.05-0.3 mm, 0.1-0.3 mm, in particular 0.1-0.15 mm; the total area of the pits accounts for 15%-40% of the area of the entire cookware body; and the pits are round or polygonal, and are gradually indented from a plane.

The pits have an aperture of 0.3-0.5 mm.

A food contact layer on the cookware body is stainless steel, the back of which is provided with a composite aluminum layer.

The stainless steel is provided with a multiarc plasma or magnetron sputtering based titanium- or zirconium-plated layer, with a thickness of 20-200 nm. The titanium-plated layer or the zirconium-plated layer can be alternated.

A preparation method for the uncoated pressed non-stick cookware of the present application mainly includes the preparation of uniform pits, where the uncoated pressed non-stick cookware has a stainless-steel cookware body with an inner surface prepared by pressing a stainless-steel plate-like cookware body by a pressing machine by means of uniform round raised heads (matching the size of the cookware body and the inner shape of the concave cookware) of an alloy mold. The uncoated pressed non-stick cookware has the concave cookware body formed from an austenitic stainless-steel plate or a martensitic stainless-steel plate.

Even in case of high-temperature stir-frying and dry burning, the uncoated pressed non-stick cookware does not release any toxic substances and gases, and will not pollute the food being cooked and the kitchen environment, thereby making cooking safer.

Beneficial effects: the total area of the pits accounts for 15%-40% of the area of the cookware body, contributing to a good anti-stick performance; the roughness of the inner surface of the cookware body can be improved by means of sanding, polishing or other treatments to reduce the force of friction between food and the inner surface of the cookware body, thereby making spatula turning smoother during stir-frying; and the non-stick effect substantially reaches a new application level of the PTFE or Teflon coating. In particular, the manufacturing cost is low, which is half the manufacturing cost of a functional non-stick cookware. These features and advantages of the present invention will be disclosed in detail in the following detailed description and the accompanying drawings.

BRIEF DESCRIPTION OF THE DRAWINGS

The present invention will be further described below with reference to the following accompanying drawings.

DETAILED DESCRIPTION OF THE PREFERRED EMBODIMENTS

Figure 1:
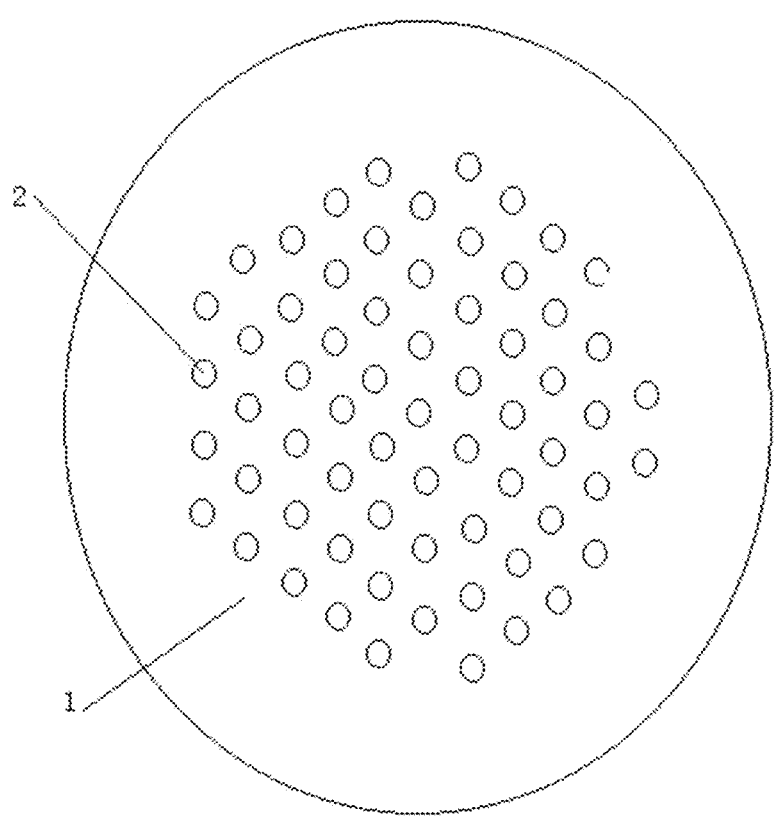
FIG. 1 is a schematic diagram showing the distribution of pits in a cookware body according to an embodiment of the present invention.
Figure 2:
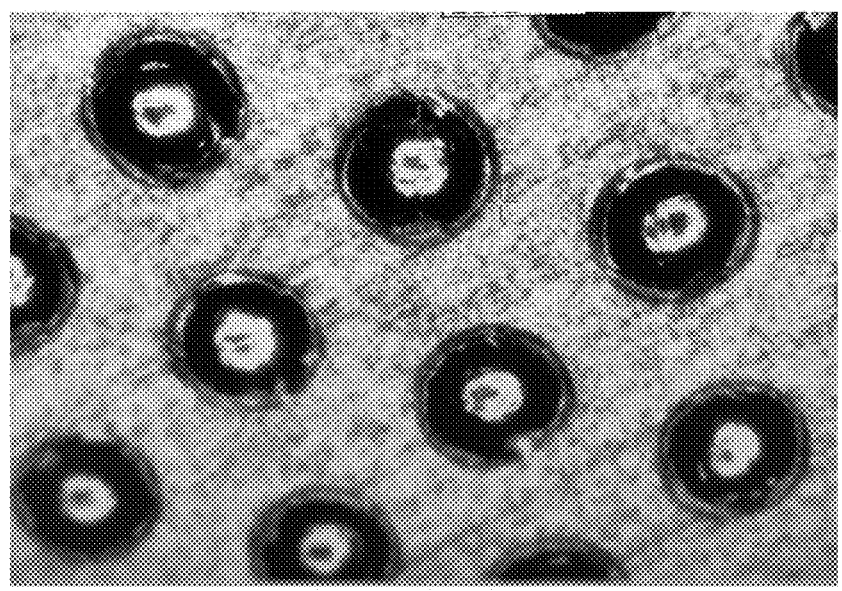
FIG. 2 is a microphotograph of pits after the preparation of the present invention.

Embodiments of the present invention will be described in detail below. Examples of the embodiments are shown in the accompanying drawings, in which the same or similar reference numbers indicate the same objects all the way. FIG. 1 shows a cookware body surface 1 and pits 2. As shown in the microphotograph in FIG. 2, this embodiment relates to an uncoated pressed non-stick cookware, on which the pits 2 with consistent depth are preferably uniformly distributed. The pits may also be distributed more closely at the bottom of the cookware than at the edge of the cookware. The cookware body surface 1 is present between two adjacent pits.

In a further solution, the pits have a diameter of 200 μm, 300 μm, 400 μm or 500 μm, and the width of the surface between the pits is 100-400 μm. The pits are prepared under the pressing of a pressure device by means of a mold prepared from a hard alloy, such that the obtained pits and cookware body are both of a hardened layer structure. The mold prepared from the hard alloy and having uniformly distributed round or polygonal raised heads presses a plate of the cookware body to form the pits uniformly distributed on the cookware body. Since the mold is provided with the uniformly distributed round raised heads (round head pins) that correspond to the pits in the cookware body, the round raised heads designed on the mold can control the distribution of the pits to allow the distance between the centers of the pits to be 0.6-2 mm, such that the distance between the edges of adjacent pits is controlled to 0.3-1.8 mm, and the depth of each pit is in particular 0.1-0.18 mm.

The total area of the pits 2 accounts for 15%-40% (for example, 15%, 20%, 35%, or 40% as in the embodiments of the present invention) of the area of the entire region. Then, both the physical non-stick performance and the service life of the entire non-stick cookware can be ensured.

Food contact layer on the cookware body is stainless steel or uncoated titanium layer (0.5 mm), the back of which is provided with a composite aluminum layer (1.5 mm).

The pits, concave holes, are round or polygonal, and the polygonal pits correspond to polygonal raised convex heads uniformly prepared on the mold. The pits are gradually indented from a flat surface.

The body plate of the cookware is in the shape of a concave cookware, which is formed from a flat plate pressed by a hydraulic pressing equipment. The cookware body is connected with a cookware handle. The back of the stainless steel or titanium material is compounded with an aluminum layer. When compounding the pot body material, the thickness of the stainless steel or titanium material is about 0.5 mm, and the aluminum layer is about 1.5 mm; stainless steel or titanium is combined with an aluminum plate by means of pressing or explosive compounding.

Although the embodiments of the present invention have been illustrated and described above, it should be understood that the embodiments above are exemplary, and are not intended to limit the present invention. Without departing from the principle and intention of the present invention, those skilled in the art may make alternations, modifications, substitutions, and variations to the embodiments above within the scope of the present invention.

The invention claimed is:

1. The uncoated pressed non-stick cookware, comprising
 [a] a cookware body, comprising a bottom portion of the cookware formed from explosively compounded layers of
    (i) an uncoated stainless steel or uncoated titanium food-contact layer at 0.5 mm thick; and
    (ii) a composite aluminum backing layer at 1.5 mm thick;
 [b] uniformly distributed pits, on a food-contact surface of the cookware body, arranged in a hexagonal grid pattern,
    wherein the pits have
    an aperture of 0.3-0.5 mm,
    a distance between edges of adjacent pits of 0.3-1.8 mm, a depth of 0.1-0.15 mm; and
    a concave curvature radius of 0.2-0.4 mm transitioning smoothly from the cookware food-contact surface,
    and wherein the pits are formed by pressing with a hard alloy mold comprising raised heads corresponding to the pits,
    wherein the uncoated pressed non-stick cookware is configured to reduce friction between food and the food-contact surface of the cookware body, thereby enabling smoother spatula movement during stir-frying and achieving a non-stick effect comparable to that of PTFE coatings, without the use of such coatings.

2. The uncoated pressed non-stick cookware according to claim 1, wherein the area of the pits accounts for 15%-40% of the area of the bottom portion of the cookware.

3. The uncoated pressed non-stick cookware according to claim 1, wherein the pits are round or polygonal.

4. The uncoated pressed non-stick cookware according to claim 1, wherein the food contact surface on the cookware body is the uncoated stainless steel or uncoated titanium and composite aluminum layer is underneath the.

5. The uncoated pressed non-stick cookware according to claim 1, wherein the food-contact surface on the cookware body is provided with an alternating multiarc plasma or magnetron sputtering based titanium-plated and zirconium-plated layer, which has a thickness of 20-200 nm.

\* \* \* \* \*